United States Patent

Ishiwata et al.

[11] Patent Number: 6,055,137
[45] Date of Patent: Apr. 25, 2000

[54] MAGNETORESISTIVE EFFECT COMPOSITE HEAD WITH CONFIGURED POLE TIP

[75] Inventors: Nobuyuki Ishiwata; Tsutomu Ishi; Kiyokazu Nagahara; Kazumasa Kumagai, all of Tokyo, Japan

[73] Assignee: NEC Corporation, Japan

[21] Appl. No.: 08/990,018

[22] Filed: Dec. 12, 1997

[30] Foreign Application Priority Data

Dec. 18, 1996 [JP] Japan ................................. 8-338578

[51] Int. Cl.$^7$ .................................................. G11B 5/42
[52] U.S. Cl. ........................................... 360/113; 360/126
[58] Field of Search ................................... 360/113, 119, 360/122, 125, 126

[56] References Cited

U.S. PATENT DOCUMENTS

| | | | |
|---|---|---|---|
| 4,921,508 | 5/1990 | Nonaka | 29/603.15 |
| 5,218,499 | 6/1993 | Wada et al. | 360/126 |
| 5,600,519 | 2/1997 | Heim et al. | 360/126 |
| 5,726,841 | 3/1998 | Tong et al. | 360/122 |
| 5,805,391 | 9/1998 | Chang et al. | 360/113 |
| 5,850,326 | 12/1998 | Takano et al. | 360/122 |

OTHER PUBLICATIONS

"A Magnetoresistive Readout Transducer" Robert P. Hunt IEEEE Transactions of Magnetics, vol. MAG–7, No. 1, pp. 150–154, Mar. 1971.

*Primary Examiner*—Brian E. Miller
*Attorney, Agent, or Firm*—Hayes, Soloway, Hennessey, Grossman & Hage, P.C.

[57] ABSTRACT

A magnetoresistive effect composite head includes a read magnetoresistive effect (MR) head and a recording inductive (ID) head. The MR head has first and second magnetic shield films and an MR element. The first and second magnetic shield films are formed on a slider main body in a stacked manner through a predetermined gap therebetween. Each of the first and second magnetic shield films has an end face flush with a slider floating surface. The MR element is formed between the first and second magnetic shield films through magnetic isolation layers each made of an insulator. The ID head has a first magnetic pole film, a coil, and a second magnetic pole film. The first magnetic pole film serves also as the second magnetic shield film. The coil and the second magnetic pole film are formed through an insulator on the first magnetic pole film on a surface opposite to the MR element through a predetermined magnetic gap. The second magnetic pole film has a projecting portion that defines a track width. The projecting portion has a distal end face substantially flush with the slider floating surface. A method of manufacturing a magnetoresistive effect head is also disclosed.

3 Claims, 6 Drawing Sheets

MAGNETORESISTIVE EFFECT COMPOSITE HEAD WITH CONFIGURED POLE TIP

BACKGROUND OF THE INVENTION

The present invention relates to a magnetoresistive effect composite head and a method of manufacturing the same and, more particularly, to a magnetoresistive effect composite head consisting of a read head and an inductive recording head that utilize the magnetoresistive effect, and a method of manufacturing the same.

As the magnetic recording medium is becoming downsized and its capacity is becoming large, the relative speed between the read magnetic head and the magnetic recording medium is becoming low, and therefore demand has arisen for a magnetoresistive effect head (to be referred to as an MR head hereinafter) whose read output does not depend on the speed. This MR head is discussed in "A Magnetoresistive Readout Transducer", IEEE TRANSACTIONS ON MAGNETICS, VOL. MAG-7, NO. 1, pp. 150–154, MARCH 1971.

As the most typical MR head, a magnetoresistive effect composite head (to be referred to as a composite head hereinafter) consisting of an MR head (MR element portion) and an inductive head (to be referred to as an ID head or ID element portion hereinafter) has been put into practical use.

The MR head is used to read information, and consists of two magnetic shield films arranged to be substantially parallel to a slider floating surface, i.e., an Air Bearing Surface (ABS), opposing the magnetic disk medium, and a magnetoresistive effect element present between the two magnetic shield films through magnetic isolation layers each made of an insulator.

The ID head has, as its one magnetic pole, the other magnetic shield film (upper shield) of the two magnetic shield films described above. A coil sandwiched by insulators and the other magnetic pole having a pole-like distal end portion and an angular end face are stacked on a surface of one magnetic pole on a side opposite to the magnetoresistive effect element to be parallel to one magnetic pole described above. Information is recorded by a magnetic field generated in a magnetic gap arranged between one magnetic pole and the other magnetic pole.

Originally, the other magnetic pole P2 of the ID head is formed in a magnetic field so that its magnetic anisotropy is formed in the widthwise direction, as indicated by an arrow A in FIG. 8, and is further heat-treated in the magnetic field.

As the recording density increases, the width of the other magnetic pole P2 particularly near the ABS surface decreases sharply. Accordingly, a phenomenon has become conspicuous in which the magnetic anisotropy formed by film deposition and heat treatment is strongly influenced by the shaping effect of the decrease in width and is rotated through 90°, as indicated by an arrow A' in FIG. 9. The reason for this is as follows. Along with an increase in recording density, when the width of the pole-like distal end portion of the other magnetic pole decreases, the magnetic anisotropy of the other magnetic pole becomes difficult to form, and tends to be formed in a direction parallel to the direction of recording magnetic field due to the shaping effect.

The direction of magnetic anisotropy of one magnetic pole of the ID head serving also as the upper shield and that of the other magnetic pole of the ID head corresponding to it must be perpendicular to the direction of recording magnetic field in order to improve the recording characteristics in a high-frequency range. Therefore, when the width of the pole-like distal end portion of the other magnetic pole decreases, an apparent degradation occurs in the recording characteristics in the high-frequency range.

SUMMARY OF THE INVENTION

It is an object of the present invention to provide a composite head having high recording characteristics in a high-frequency range in which the directions of magnetic anisotropy of the magnetic poles of the ID head are constantly perpendicular to the direction of recording magnetic field.

In order to achieve the above object, according to the present invention, there is provided a magnetoresistive effect composite head comprising a read magnetoresistive effect (MR) head and a recording inductive (ID) head, wherein the MR head has first and second magnetic shield films formed on a slider main body in a stacked manner through a predetermined gap therebetween and each having an end face flush with a slider floating surface, and an MR element formed between the first and second magnetic shield films through magnetic isolation layers each made of an insulator, and the ID head has a first magnetic pole film serving also as the second magnetic shield film, and a coil and a second magnetic pole film formed through an insulator on the first magnetic pole film on a surface opposite to the MR element through a predetermined magnetic gap, the second magnetic pole film having a projecting portion that defines a track width, and the projecting portion having a distal end face substantially flush with the slider floating surface.

DESCRIPTION OF THE PREFERRED EMBODIMENT

The present invention will be described in detail with reference to the accompanying drawings.

Figure 1:
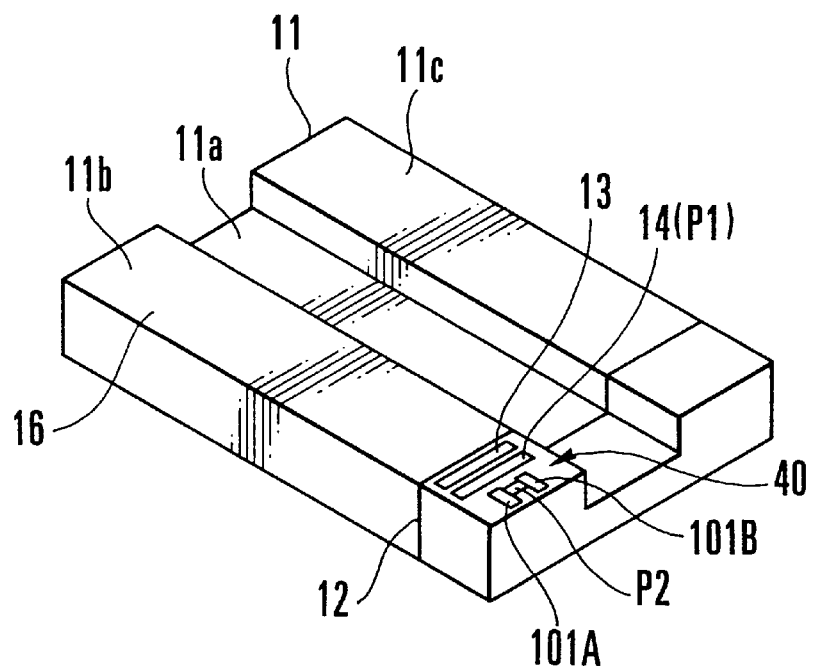
FIG. 1 is a perspective view of a magnetoresistive effect composite head according to an embodiment of the present invention seen from the slider floating surface (ABS) side.

FIG. 1 shows a magnetoresistive effect composite head according to an embodiment of the present invention seen from the slider floating surface (ABS) side. Referring to FIG. 1, a slider main body 11 has a recessed negative-pressure air generating region 11a and positive pressure generating regions 11b and 11c. The negative-pressure air generating region 11a is formed as a groove at the central portion of an ABS 16 forming a surface opposing the magnetic disk medium, and generates a negative pressure as air flows through it. The positive pressure generating regions 11b and 11c are flat surfaces formed on the two sides of the negative-pressure air generating region 11a. A composite head 40 is mounted on the downstream side (trailing edge side) of the positive pressure generating region 11b.

Figure 2:
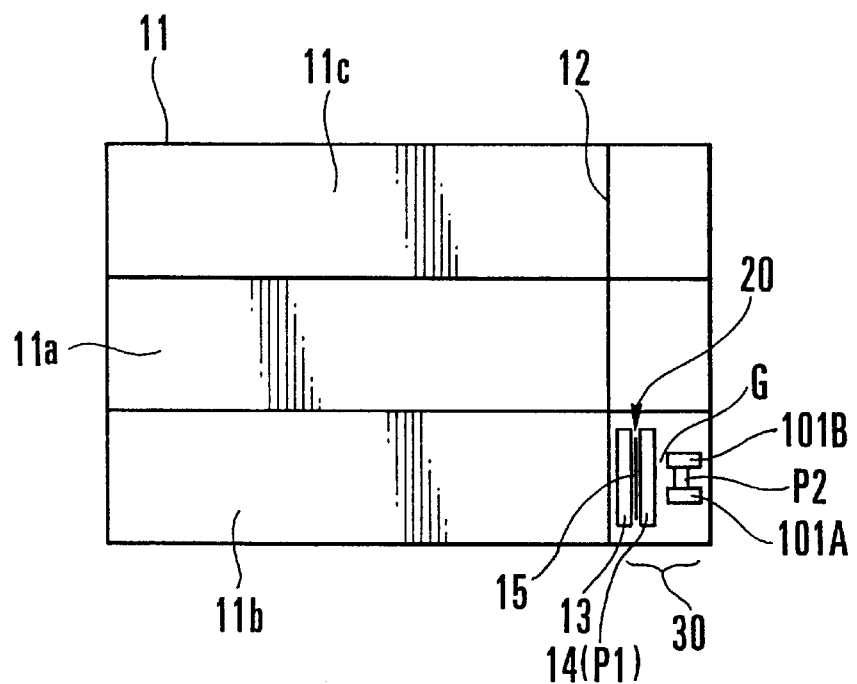
FIG. 2 is a plan view seen from the slider floating surface (ABS) side of the slider shown in FIG. 1.
Figure 3:
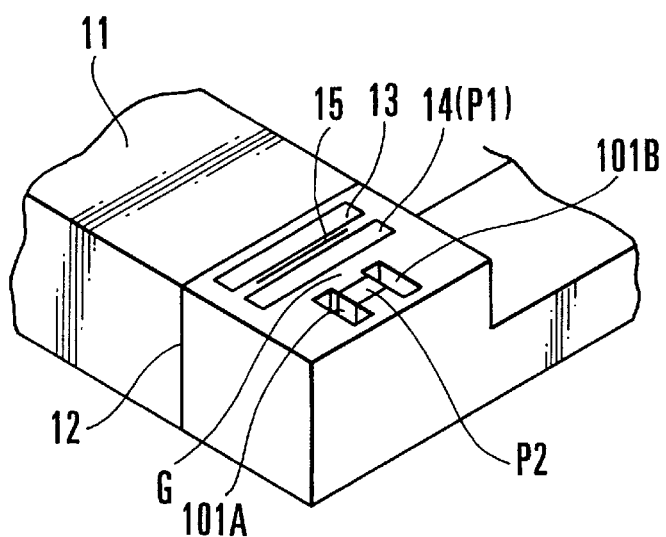
FIG. 3 is an enlarged perspective view for explaining the element portion of the composite head shown in FIG. 1.

As shown in FIG. 2, this composite head 40 has a read MR head 20 having a lower shield 13, an upper shield 14, and a magnetoresistive effect element (MR element) 15. The lower and upper shields 13 and 14 are constituted by two, lower and upper magnetic shield films formed on the slider main body 11 at a predetermined gap between them and each having an end face flush with the ABS 16. The MR element 15 is formed between the upper and lower shields 14 and 13 through electric isolation layers each made of an insulator.

Figure 4:
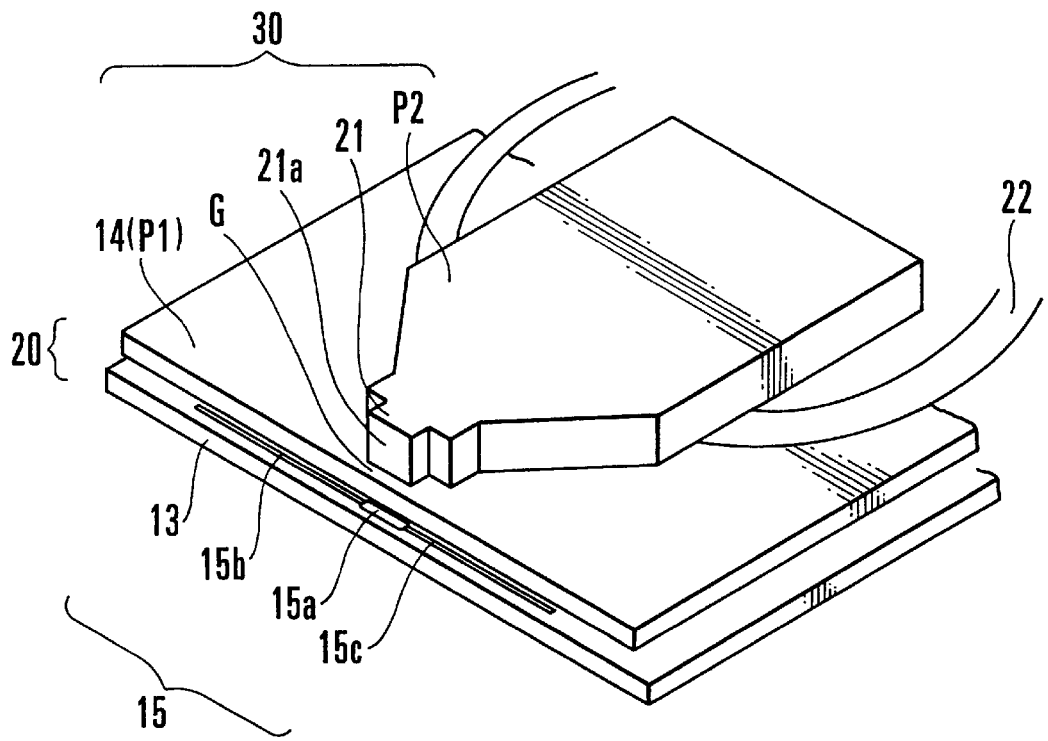
FIG. 4 is an enlarged view showing the layer structure of the head portion of the composite head shown in FIG. 3.

As shown in FIG. 4, a composite head 40 has a recording inductive head (ID head) 30 having one magnetic pole film P1 serving also as the upper shield 14, a coil 22 formed on a surface of the magnetic pole film P1 opposite to the MR element 15 through a predetermined magnetic gap G and sandwiched by insulators, and the other magnetic pole film P2. The ID head 30 records information on the magnetic disk with a magnetic field generated in the magnetic gap G arranged between the magnetic pole films P1 and P2.

A projecting portion 21 that defines the track width on the magnetic disk as the magnetic recording medium is formed on the magnetic pole film P2. A distal end face 21a of the projecting portion 21 is substantially flush with the positive pressure generating region 11b of the slider floating surface 16. Reference numerals 101A and 101B denote recessed portions that define the recording track width.

Figure 5:
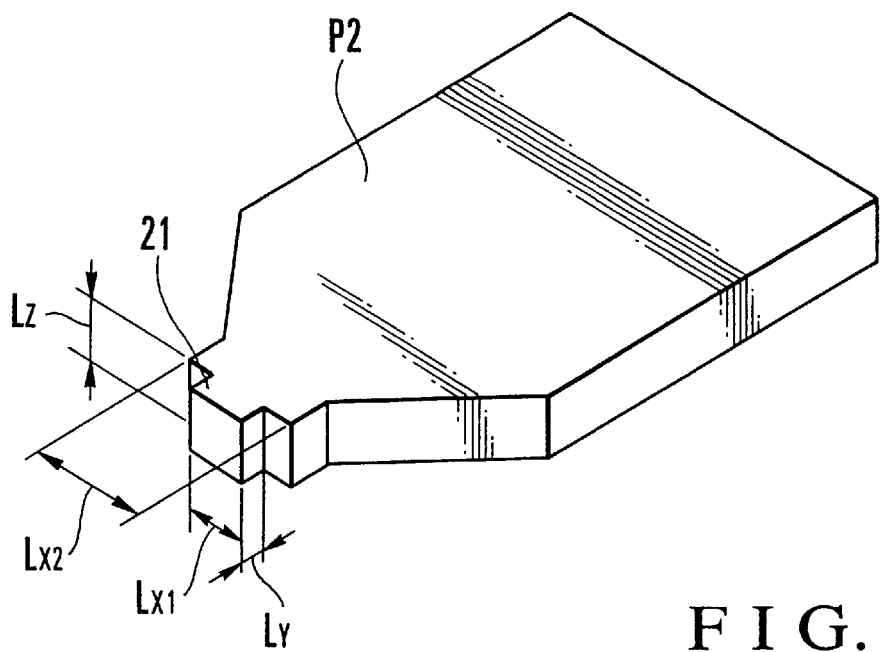
FIG. 5 is a perspective view showing the other magnetic pole of the ID head shown in FIG. 4.

In the magnetic pole film P2, as shown in FIG. 5, the projecting portion 21 is formed to satisfy $L_Z \geq L_{X1}$ where $L_{X1}$ is the width, along the lateral width of the magnetic pole film P2, of the distal end face 21a of the projecting portion 21 exposed to be flush with the slider floating surface 16, $L_Z$ is the size of the projecting portion 21, which is also the thickness of the magnetic pole film P2 including the projecting portion 21, in a direction perpendicular to the direction of width $L_{X1}$, $L_Y$ is the projecting height of the projecting portion 21 up to the distal end face 21a, and $L_{X2}$ is the width of the end face portion of the projecting portion 21 including its bottom surface. The respective sizes of the projecting portion 21 of the magnetic pole film P2 are set to satisfy $L_{X2} \geq L_Z$ and $L_{X1} \geq L_Y$.

The reason for this is as follows. Immediately before the ABS 16, the width of the upper shield 14 is $L_{X2}$. Since a width equal to or larger than its thickness is ensured for the upper shield 14, the magnetic anisotropy of this $L_{X2}$-width portion is stabilized. As a result, the projecting portion 21 ahead of the upper shield 14 can also be magnetically stabilized easily. In this case, although the projecting portion 21 cannot but be formed to satisfy $L_Z \geq L_{X1}$ if the head serves for narrow-width recording, if $L_{X1} \geq L_Y$ is set, the projecting portion 21 becomes allowable in terms of magnetic anisotropy. The magnetic anisotropy of the projecting portion 21 is also stabilized as it is influenced by the stabilization of the magnetic anisotropy of the $L_{X2}$-width portion.

The magnetoresistive effect of the MR element 15 constituting the MR head 20 is a uniaxial anisotropic magnetoresistive effect. Reference numeral 12 denotes a protective film made of an alumina film. The protective film 12 covers the entire portion of the downstream side (air outflow side) of the slider main body 11 including the MR head 20 and ID head 30.

In the MR element 15, one of two adjacent magnetic layers forms a magnetic pinned layer magnetization of which is fixed, and the other one thereof forms a magnetic free layer magnetization of which can be freely rotated with respect to the medium magnetic field. As a result, the MR element 15 can exhibit a spin-valve effect (MR effect) corresponding to the cosine between the directions of magnetization of two adjacent magnetic layers.

The slider main body 11 is made of a composite ceramic of alumina and titanium carbide. The region of the slider main body 11 where the MR head 20 and ID head 30 are loaded is covered with the protective film 12 made of an alumina film, as described above.

The upper and lower shields 14 and 13 constitute the magnetic shield of the MR element 15 and are made of an NiFe alloy (Permalloy). The thickness of the upper shield 14 is 3 $\mu$m, and that of the lower shield 13 is 2 $\mu$. The MR element 15 consisting of a central region 15a serving as a magnetic sensitizing portion and end portion regions 15b and 15c having a function of supplying a current and a longitudinal bias field to the central region 15a is mounted between the upper and lower shields 14 and 13, as shown in FIG. 4.

Figure 4A:
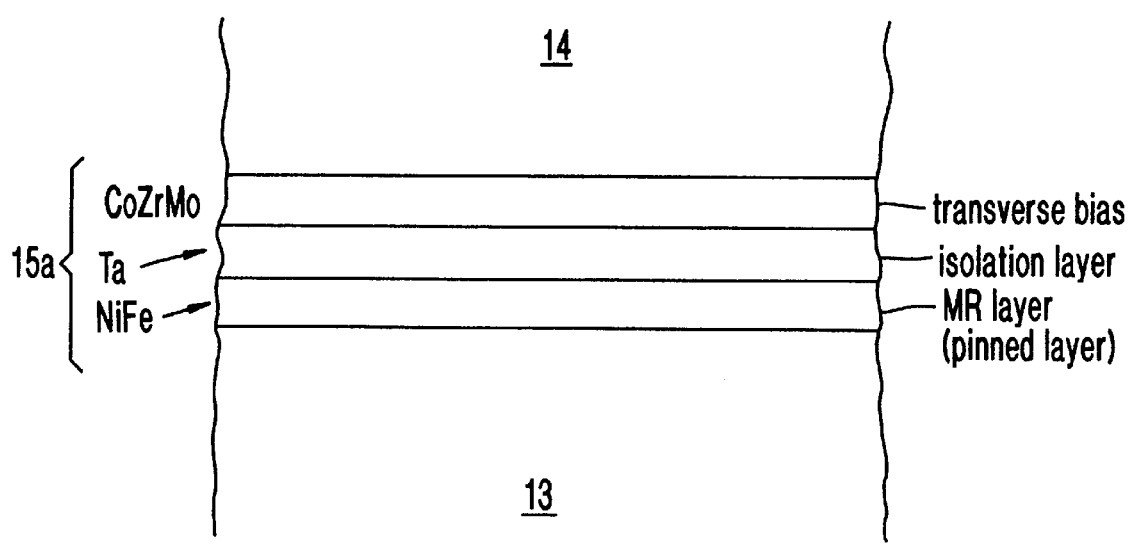
FIG. 4A is a greatly enlarged view of the layer 15 of FIG. 4.

As shown in FIG. 4A, the central region 15a consists of a 10-nm thick NiFe film having an MR effect, a 15-nm thick CoZrMo film for applying a transverse bias field to the NiFe film, and a 7-nm thick Ta film for magnetically isolating the NiFe film and CoZrMo film. These films are formed in the order of the CoZrMo film, the Ta film, and the NiFe film from the lower shield 13 side.

The width of the central region 15a is set to 1 $\mu$m. The end portion regions 15b and 15c are electrically connected to the central region 15a. Each of the end portion regions 15b and 15c is formed by stacking a 25-nm CoPtCr film for supplying a longitudinal bias field to the NiFe film of the central region 15a and an Au film for supplying a current to the central region 15a.

The MR element 15 consisting of the central region 15a and end portion regions 15b and 15c is insulated from the upper and lower shields 14 and 13 by alumina films. The alumina film on the lower shield 13 side has a thickness of 90 nm, and the alumina film on the upper shield 14 side has a thickness of 65 nm.

In the ID head 30, the other magnetic pole P2 made of NiFe is formed on the upper shield 14, i.e., on one magnetic pole P1 of the ID head 30, through the magnetic gap G made of alumina. The magnetic gap G has a gap length of 0.4 $\mu$m and a thickness of 3.5 $\mu$m. As shown in FIG. 4, the Cu coil 22 insulated by a photoresist material is mounted about 3 $\mu$m deep from the ABS 16 of the magnetic poles P1 and P2.

Figure 7A:
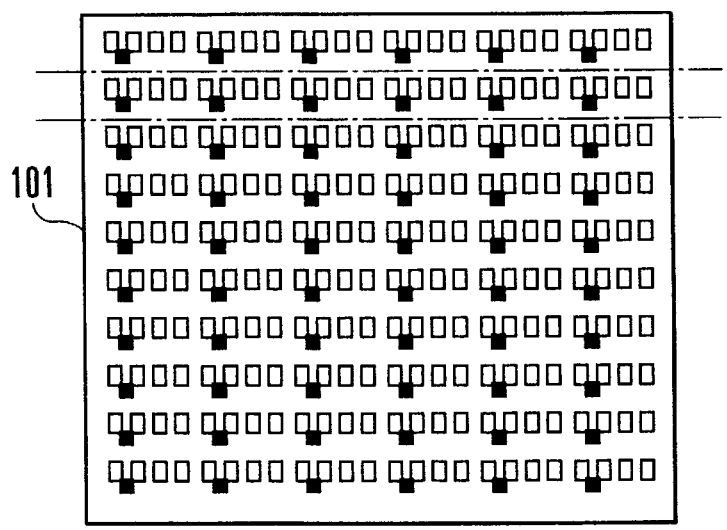
FIGS. 7A to 7D are views for explaining the steps of a method of manufacturing the composite head shown in FIG. 1.
Figure 7B:
Figure 7C:
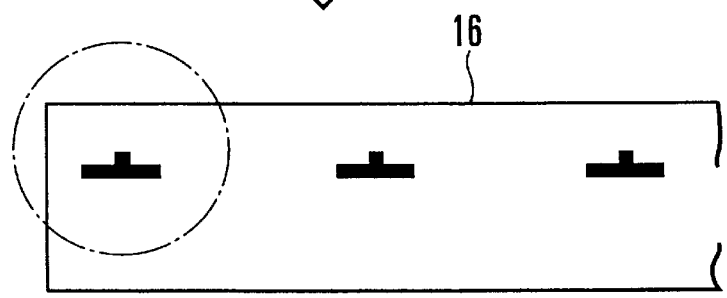
Figure 7D:
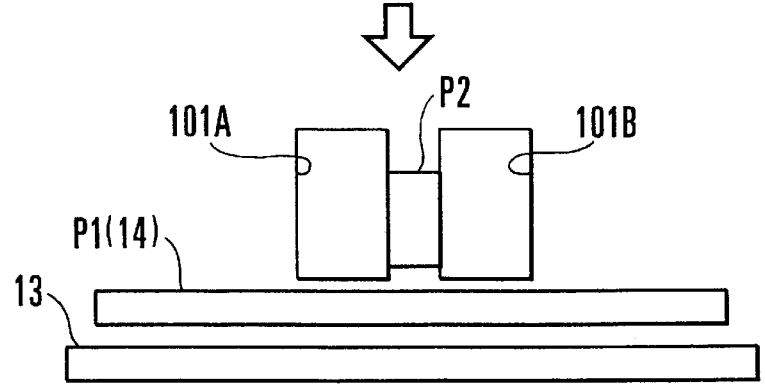
Figure 8:
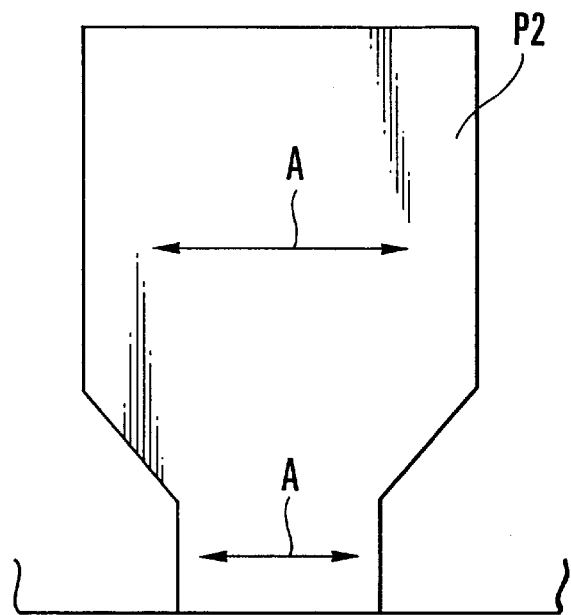
FIG. 8 is a view for explaining the magnetic pole structure and the direction of magnetic anisotropy of a conventional ID head when the recording track is wide.
Figure 9:
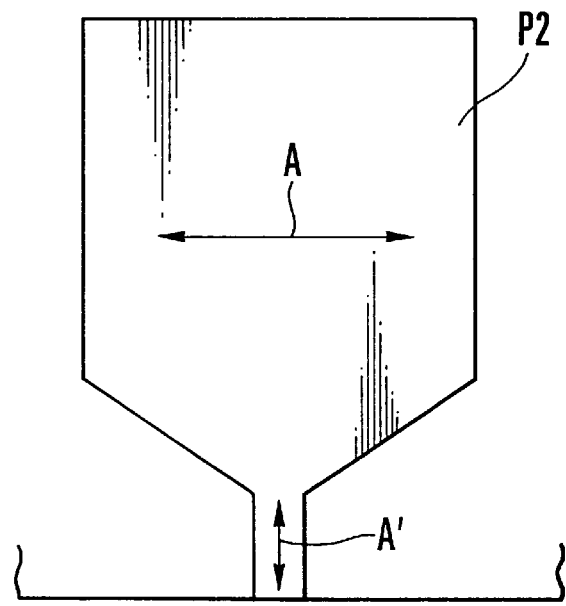
FIG. 9 is a view for explaining the magnetic pole structure and the direction of magnetic anisotropy of a conventional ID head when the recording track is narrow.

First, the MR head element and ID head element having the above arrangement are arranged on a wafer 101, as shown in the "wafer process (step 1)" of FIG. 7A. The wafer 101 is cut into bars, as shown in the "bar cutting process (step 2)" of FIG. 7B, such that the elements are arranged horizontally. The ABS 16-side surface and the slider-side surface of the elements are polished, as shown in the "ABS polish process (step 3)" of FIG. 7C. Thereafter, the recessed portions 101A and 101B for defining the width of the magnetic pole P2, i.e., the recording track width, are formed by a focused ion beam, as shown in the "recessed portion formation process (step 4)" of FIG. 7D.

The recessed portions 101A and 101B are formed along the side surface of the magnetic pole film P2 so that they define the magnetic pole film P2 to have a width of 1.3 μm. FIG. 5 shows the shape of the magnetic pole P2. The magnetic pole P2 was fabricated to satisfy $L_{X1}=1.3$ μm, $L_Z=3.5$ μm, $L_{X2}=5\mu$, and $L_Y=1$ μm in accordance with the condition described above. With the manufacturing method according to the present invention, $L_{X1}$, $L_Y$, and $L_Z$ can be determined with good controllability.

As a comparative example, a head having recessed portions with a depth $L_Y$ of 2 μm was also fabricated.

The elements fabricated in accordance with the above processes were completed as heads through slider machining and head ginbal assembly (HGA) processes. The recording/reading characteristics of the resultant heads were evaluated.

Figure 6:
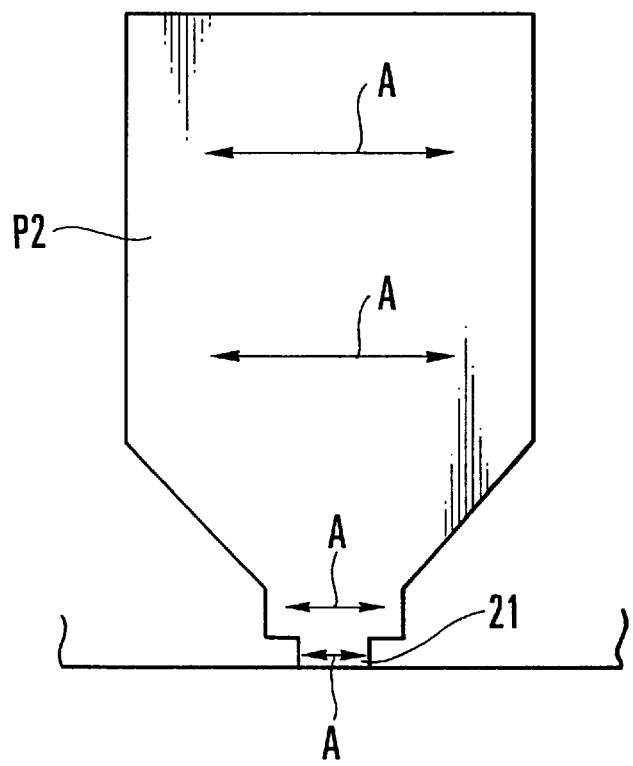
FIG. 6 is a view showing the direction of magnetic anisotropy of the other magnetic pole of the ID head shown in FIG. 4.

As a result, with the composite head according to this embodiment, good narrow-track recording characteristics were obtained due to the magnetic pole film P2 which was defined to have a small width by formation of the recessed portions 101A and 101B. Since the position error between the MR head 20 and ID head 30 is corrected, an increase in manufacturing yield is realized. Simultaneously, it was confirmed that a direction A of magnetic anisotropy of the magnetic pole P2 was stabilized in the direction of easy axis of magnetization, as shown in FIG. 6, so that good recording characteristics having a small nonlinear transition shift (NLTS) were obtained even if the frequency was equal to or higher than 100 MHz.

In contrast to this, in the head fabricated as the comparative example, an increase in NLTS in a high-frequency range was conspicuous. This can be analyzed as follows. Since the magnetic pole head P2 formed by the focused ion beam had an inappropriate shape, its magnetic anisotropy became unstable, and particularly a magnetic anisotropy parallel to the recording magnetic field was formed near the ABS.

The same effect as that described above can be obtained also with the MR head 20 using the MR element 15, in which one of the two adjacent magnetic layers forms a magnetic pinned layer magnetization of which is fixed, and the other one forms a magnetic free layer magnetization of which can be freely rotated with respect to the medium magnetic field, so that the MR element 15 can exhibit a spin-valve effect (MR effect) corresponding to the cosine between the directions of magnetization of the two adjacent magnetic layers.

As has been described above, according to the present invention, unlike in the conventional case, the direction of easy axis of magnetization obtained when the other magnetic pole is formed is stabilized even if the width of the other magnetic pole opposing the ABS decreases. As a result, the recording characteristics in the high-frequency range can be improved reliably.

As the manufacturing method of the other magnetic pole, when performing slider machining after the wafer process is ended, a method of cutting the wafer such that the elements are horizontally arranged in a row state, and forming a desired projecting portion from the ABS with a focused ion beam, after lapping of the ABS surface to determine the height of the magnetic poles is performed, is employed. As a result, the controllability is improved, and the manufacturing yield of the composite head having good high-frequency recording characteristics can increase.

What is claimed is:

1. A magnetoresistive effect composite head comprising a read magnetoresistive effect (MR) head and a recording inductive (ID) head, wherein said MR head has first and second magnetic shield films formed on a slider main body in a stacked manner through a predetermined gap therebetween and each having an end face flush with a slider floating surface, and an MR element formed between said first and second magnetic shield films through magnetic isolation layers each made of an insulator, and said ID head has a first magnetic pole film serving also as said second magnetic shield film, and a coil and a second magnetic pole film through an insulator formed on said firm magnetic pole film on a surface opposite to said MR element through a predetermined magnetic gap, said second magnetic pole film having a projecting portion that defines a track width, and said projecting portion having a distal end face substantially flush with said slider floating surface, said projecting portion having a lateral width and thickness proportioned to stabilize the magnetic anisotropy of the projecting portion so that the anisotropy is perpendicular to the recording magnetic field, and wherein said projecting portion is formed to satisfy $L_z \geq L_{x1}$, $L_{x2} \geq L_z$, and $L_{x1} \geq L_y$ where $L_{x1}$ is a width of said second magnetic pole film in a direction of a lateral width thereof, $L_z$ is a thickness of said second magnetic pole film in a direction perpendicular to the direction of the lateral width thereof, $L_y$ is a projecting height of said projecting portion, and $L_{x2}$ is a width of a proximal end face, including a bottom surface, of said projecting portion.

2. A head according to claim 1, wherein said MR element has a uniaxial anisotropic magnetoresistive effect.

3. A head according to claim 1, wherein said magnetoresistive effect element has a magnetic pinned layer formed of one of two adjacent magnetic layers and magnetization of which is fixed, and a magnetic free layer formed of the other of said two adjacent magnetic layers and magnetization of which can be freely rotated with respect to a medium magnetic field, and said magnetoresistive effect element has a spin-valve effect corresponding to a cosine between directions of magnetization of said two adjacent magnetic layers.

* * * * *